(12) United States Patent
Fukuyama et al.

(10) Patent No.: US 10,260,604 B2
(45) Date of Patent: Apr. 16, 2019

(54) SPEED INCREASER

(71) Applicant: KABUSHIKI KAISHA TOYOTA JIDOSHOKKI, Kariya-shi, Aichi (JP)

(72) Inventors: Ryosuke Fukuyama, Kariya (JP); Kaho Takeuchi, Kariya (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 134 days.

(21) Appl. No.: 15/462,247

(22) Filed: Mar. 17, 2017

(65) Prior Publication Data

US 2017/0284518 A1    Oct. 5, 2017

(30) Foreign Application Priority Data

Mar. 31, 2016 (JP) ................................ 2016-072524

(51) Int. Cl.
*F16H 13/08* (2006.01)
*F16H 13/06* (2006.01)
(Continued)

(52) U.S. Cl.
CPC ............ *F16H 13/08* (2013.01); *F04D 17/10* (2013.01); *F04D 25/028* (2013.01); *F04D 25/06* (2013.01); *F16H 13/06* (2013.01)

(58) Field of Classification Search
CPC ........ F16H 13/08; F04D 24/028; F04D 24/06; F04D 25/06; F04D 17/10; F04D 13/06
See application file for complete search history.

(56) References Cited

U.S. PATENT DOCUMENTS 1,106,246 A * 8/1914 Schoedelin ............. F16H 13/06
476/67
2,778,227 A * 1/1957 Roesch .................. G01C 19/38
74/5.7
(Continued)

FOREIGN PATENT DOCUMENTS

JP    H06-034005    2/1994
JP    2004-190787   7/2004
(Continued)

OTHER PUBLICATIONS

Korean Office Action in corresponding Korean Application No. 10-2017-0035897 dated Aug. 2, 2018.
(Continued)

*Primary Examiner* — Jacob S. Scott
*Assistant Examiner* — Tinh Dang
(74) *Attorney, Agent, or Firm* — Greenblum & Bernstein, P.L.C.

(57) ABSTRACT

A speed increaser includes an annular peripheral wall rotatable with a rotation of the low-speed shaft, a high-speed shaft disposed within the peripheral wall and having a rotation axis extending in the same direction as that of the peripheral wall, and three rollers disposed within the peripheral wall and in contact with both the peripheral wall and the high-speed shaft. The three rollers are disposed at different positions along the rotation axis of the high-speed shaft with rotation axes of the three rollers extending in the same direction as the rotation axis of the high-speed shaft, and the rotation axes of the three rollers are spaced in a circumferential direction of the high-speed shaft. The three rollers are disposed so that at least part of contact areas between the high-speed shaft and the rollers is free from overlapping with each other along the rotation axis of the high-speed shaft.

3 Claims, 3 Drawing Sheets

(51) Int. Cl.
  *F04D 25/06* (2006.01)
  *F04D 17/10* (2006.01)
  *F04D 13/06* (2006.01)
  *F04D 25/02* (2006.01)

(56) References Cited

U.S. PATENT DOCUMENTS

| | | | | |
|---|---|---|---|---|
| 3,380,312 A | * | 4/1968 | Barske | F16H 13/02 476/61 |
| 3,776,051 A | * | 12/1973 | Kraus | F16H 13/14 476/61 |
| 3,848,476 A | * | 11/1974 | Kraus | F16H 13/04 476/67 |
| 3,941,004 A | * | 3/1976 | Kraus | F16H 13/04 476/8 |
| 3,945,270 A | * | 3/1976 | Nelson | F16H 13/04 476/61 |
| 4,408,503 A | * | 10/1983 | Kraus | F16H 13/04 476/65 |
| 4,440,043 A | * | 4/1984 | Kraus | F16H 13/06 475/159 |
| 4,471,667 A | * | 9/1984 | Kraus | F16H 13/08 476/61 |
| 4,491,038 A | * | 1/1985 | Kraus | F16H 13/06 475/183 |
| 4,709,589 A | * | 12/1987 | Kraus | F16H 13/06 411/369 |
| 5,085,091 A | * | 2/1992 | Stampa | F16H 13/06 384/552 |
| 5,931,759 A | * | 8/1999 | Otaki | B62M 6/40 475/183 |
| 6,162,145 A | * | 12/2000 | Wang | F16H 13/06 476/67 |
| 6,554,730 B1 | * | 4/2003 | Sakai | B62M 6/55 180/206.4 |
| 6,789,438 B2 | * | 9/2004 | Tanaka | F02N 15/067 476/67 |
| 6,960,147 B2 | * | 11/2005 | Kolstrup | F16H 13/06 475/170 |
| 6,994,531 B2 | * | 2/2006 | Dairokuno | F04D 13/021 123/559.1 |
| 7,153,230 B2 | * | 12/2006 | Ai | F16H 13/06 475/166 |
| 8,152,677 B2 | * | 4/2012 | Knepper | F16H 13/06 475/183 |
| 2018/0347675 A1 | * | 12/2018 | Kawahara | F16H 13/04 |

FOREIGN PATENT DOCUMENTS

| | | |
|---|---|---|
| JP | 2004-308757 | 11/2004 |
| JP | 2015-140682 | 8/2015 |
| WO | WO2015/111355 | 7/2015 |

OTHER PUBLICATIONS

Korean Office Action in corresponding Korean Application No. 10-2017-0035897 dated Feb. 13, 2018.

* cited by examiner

SPEED INCREASER

BACKGROUND OF THE INVENTION

The present invention relates to a speed increaser.

Japanese Patent Application Publication 2004-308757 discloses a speed increaser including an annular peripheral wall that is rotatable with the rotation of a low-speed shaft, a high-speed shaft that is disposed within the ring member and three rollers that are disposed within the ring member and in contact with the peripheral wall and the high-speed shaft. In this speed increaser, when the low-speed shaft is rotated with oil sufficiently supplied, an oil film is formed at positions where the rollers are in contact with the peripheral wall and with the high-speed shaft, and the rotation of the low-speed shaft is transmitted to the high-speed shaft through the oil film thereby to rotate the high-speed shaft at a speed greater than that of the low-speed shaft.

A speed ratio of the speed increaser of the above-cited Publication is determined by the ratio of the inner diameter of the ring to the outer diameter of the high-speed shaft. In order to increase the speed ratio in a speed increaser having a peripheral wall with a constant inner diameter, for example, the diameter of the high-speed shaft may be reduced and the diameters of the rollers may be set so that the power of the low-speed shaft is transmitted to the high speed shaft.

In the above speed increaser having a configuration in which the high-speed shaft is supported by three rollers disposed within the ring member, the high-speed shaft may be supported more stably, as compared with the case in which the high-speed shaft is supported by two rollers. In order to increase a speed ratio in the speed increaser having three rollers, interference between the rollers, which may be caused by an increase of the diameter of the rollers, need be considered, so that the diameter of the high-speed shaft may be reduced only within a range that cause no interference of the rollers. As a result, there is a fear that a desirable speed ratio may not be achieved.

The present invention, which has been made in light of the above problems, is directed to providing a speed increaser that uses three rollers and permits achieving a desired speed ratio.

SUMMARY OF THE INVENTION

In accordance with an aspect of the present invention, there is provided a speed increaser including annular peripheral wall disposed coaxially with a low-speed shaft and rotatable with a rotation of the low-speed shaft, a high-speed shaft disposed within the peripheral wall and having a rotation axis extending in the same direction as a rotation axis of the peripheral wall, and three rollers disposed within the peripheral wall and in contact with both the peripheral wall and the high-speed shaft. The three rollers are disposed at different positions along the rotation axis of the high-speed shaft with rotation axes of the three rollers extending in the same direction as the rotation axis of the high-speed shaft, and the rotation axes of the three rollers are spaced in a circumferential direction of the high-speed shaft. The three rollers are disposed so that at least part of contact areas between the high-speed shaft and the rollers is free from overlapping with each other along the rotation axis of the high-speed shaft.

Other aspects and advantages of the invention will become apparent from the following description, taken in conjunction with the accompanying drawings, illustrating by way of example the principles of the invention.

DETAILED DESCRIPTION OF THE EMBODIMENTS

Figure 1:
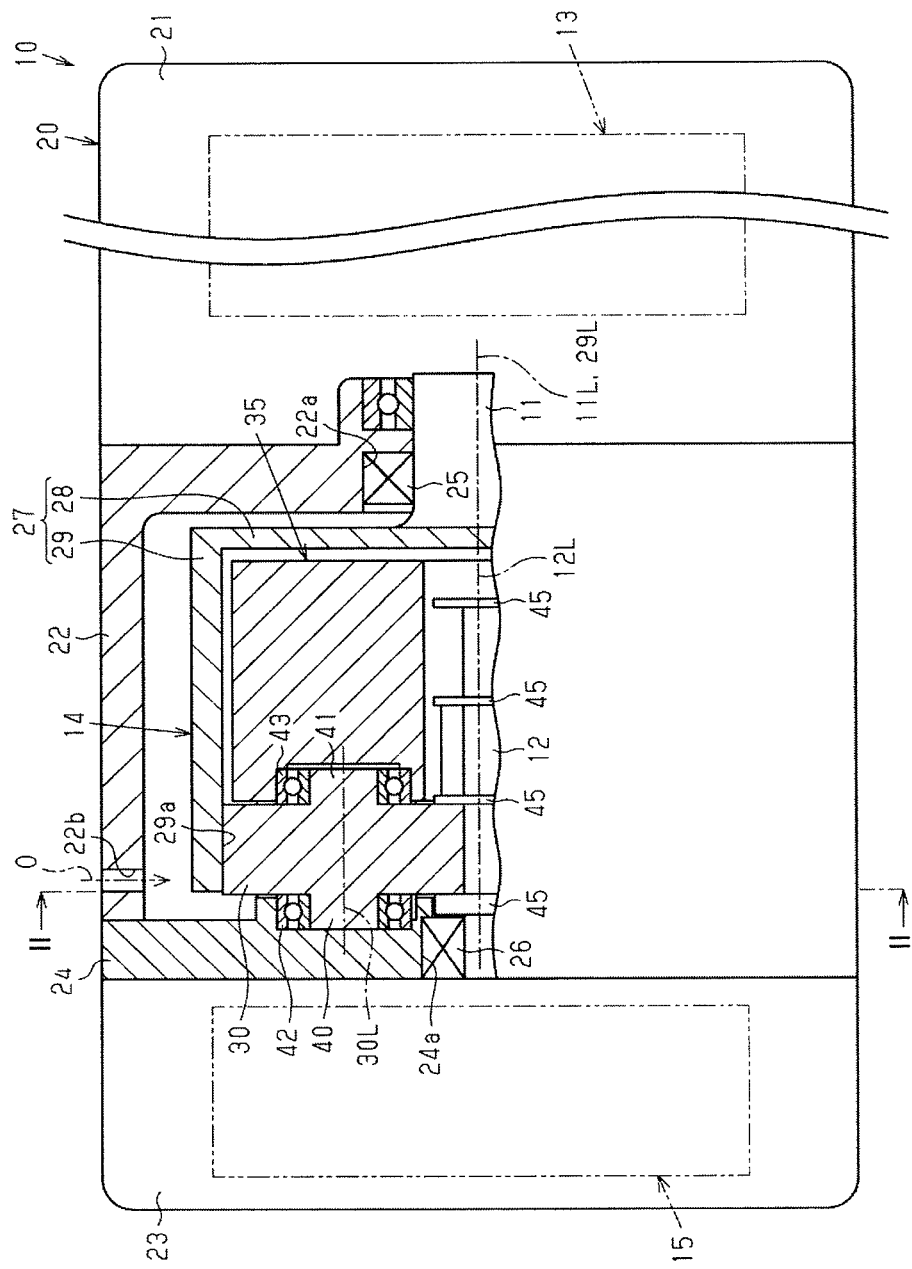
FIG. 1 is a schematic fragmentary longitudinal sectional view of a speed increaser and a centrifugal compressor according to a first embodiment of the present invention.
Figure 2:
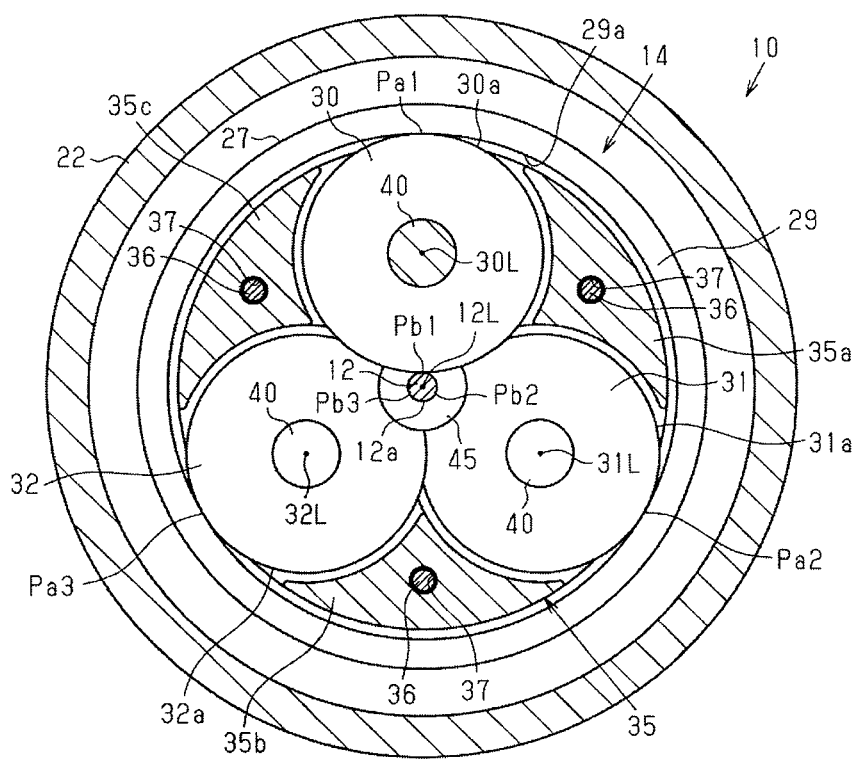
FIG. 2 is a cross-sectional view take along line II-II of FIG. 1.
Figure 3:
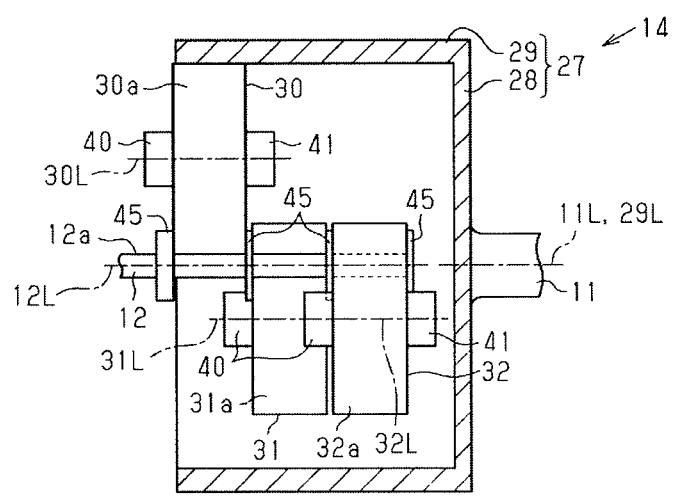
FIG. 3 is a cross-sectional view of a high-speed shaft, showing positions of three rollers.

The following will describe a speed increaser according to a first embodiment of the present invention with reference to FIGS. 1 through 3. The speed increaser of the present invention is adapted for use in a centrifugal compressor that is mounted on a fuel cell vehicle (FCV) having a fuel cell battery and sends air to the fuel cell battery.

Referring to FIG. 1, there is shown a centrifugal compressor 10 that includes a low-speed shaft 11, a high-speed shaft 12, an electric motor 13 driving to rotate the low-speed shaft 11, a speed increaser 14 increasing the rotation speed of the low-speed shaft 11 and transmitting it to the high-speed shaft 12 and a compression part 15 connected to and high-speed shaft 12 and compressing a fluid (air in the present embodiment) with the rotation of the high-speed shaft 12. The low-speed and high-speed shafts 11, 12 are made of a metal such as steel.

The centrifugal compressor 10 includes a housing 20 that forms the outer shell of the centrifugal compressor 10. The housing 20 has a generally cylindrical shape and accommodates therein the low-speed and high-speed shafts 11, 12, the electric motor 13, the speed increaser 14 and the compression part 15. The housing 20 includes a motor housing 21 accommodating therein the electric motor 13, a speed increaser housing 22 accommodating therein the speed increaser 14 and a compressor housing 23 accommodating therein the compression part 15. The motor housing 21, the speed increaser housing 22 and the compressor housing 23 are arranged in this order along the axial direction of the housing 20. The housing 20 further includes a plate 24 that is interposed between the speed increaser housing 22 and the compressor housing 23. The motor housing 21 is arranged on one side of the speed increaser housing 22 and the compressor housing 23 is arranged on the other side of the speed increaser housing 22 with the plate 24 disposed therebetween.

The low-speed shaft 11 is accommodated in the motor housing 21. The low-speed shaft 11 is disposed coaxially with and rotatably supported by the housing 20. Part of the low-speed shaft 11 is inserted through a hole 22a formed extending through the bottom wall of the speed increaser housing 22, so that the part of the low-speed shaft 11 is positioned in the speed increaser housing 22. A seal member 25 is interposed between the inner peripheral surface of the hole 22a of the speed increaser housing 22 and the low-speed shaft 11 so as to prevent oil O from flowing out from the speed increaser housing 22 into the motor housing 21. The oil O is flowed into the speed increaser housing 22 through an intake port 22b formed in the speed increaser housing 22 and circulated within the speed increaser housing 22. Then, the oil O is discharged though a discharge port (not shown) formed in the speed increaser housing 22.

The electric motor 13 which is accommodated in the motor housing 21 includes a rotor that is fixed on the low-speed shaft 11 and a stator that is disposed radially outward of the rotor and fixed to the inner peripheral surface of the motor housing 21. With a coil of the stator energized by electric current, the low-speed shaft 11 and the rotor are rotated integrally.

The high-speed shaft 12, which forms a part of the speed increaser 14, is accommodated in the speed increaser housing 22. The high-speed shaft 12 is disposed coaxially with and rotatably supported by the housing 20. In the present embodiment, the high-speed shaft 12 and the low-speed shaft 11 are disposed coaxially. The high-speed shaft 12 extends through a hole 24a formed through the plate 24, so that part of the high-speed shaft 12 is positioned in the compressor housing 23. A seal member 26 is interposed between the inner peripheral surface of the hole 24a of the plate 24 and the high-speed shaft 12 to prevent oil O from flowing out from the speed increaser housing 22 into the compressor housing 23.

The compression part 15 is configured to compress a fluid drawn in and discharge the compressed fluid. The compression part 15 of the centrifugal compressor 10 includes an impeller, a diffuser passage and a discharge chamber (none of them being shown). The impeller is mounted on the high-speed shaft 12 for rotation therewith. With the rotation of the impeller with the high-speed shaft 12, the fluid drawn into the compression part 15 is compressed, and the compressed fluid is further compressed while passing through the diffuser passage toward the discharge chamber and discharged from the discharge chamber.

The speed increaser 14 of the present embodiment is of a so-called traction drive type (friction roller type). As shown in FIG. 1, the speed increaser 14 includes a ring member 27 that is connected to and rotatable with the low-speed shaft 11. The ring member 27 includes a base 28 that has a disk shape and is connected to the low-speed shaft 11 and an annular peripheral wall 29 that extends from the outer periphery of the base 28 towards the plate 24. The peripheral wall 29 is rotatable with the rotation of the low-speed shaft 11. The inner diameter of the peripheral wall 29 is greater than the diameter of the end of the low-speed shaft 11 that is connected to the base 28.

According to the present embodiment, the ring member 27 and the low-speed shaft 11 are connected to each other so that the rotation axis of the base 28 of the ring member 27 extends coaxially with the rotation axis 11L of the low-speed shaft 11. In addition, the rotation axis 29L of the peripheral wall 29 extends coaxially with the rotation axis 11L of the low-speed shaft 11. The ring member 27 rotates with the rotation of the low-speed shaft 11. In other words, the peripheral wall 29 is disposed coaxially with the low-speed shaft 11. Part of the high-speed shaft 12 is disposed within the peripheral wall 29 of the ring member 27. Symbol 12L shown in FIG. 1 indicates the rotation axis of the high-speed shaft 12.

Referring to FIG. 2, the speed increaser 14 further includes three rollers, namely, first, second and third rollers 30, 31, 32 that are disposed within the peripheral wall 29 and in contact with both the peripheral wall 29 and the high-speed shaft 12. The first, second and third rollers 30, 31, 32 have a cylindrical shape and disposed with the rotation axes thereof extending in the same direction as the rotation axis 12L of high-speed shaft 12. The first, second and third rollers 30, 31, 32 are disposed with the rotation axes 30L, 31L, 32L thereof spaced angularly at a regular interval (at 120 degree in the present embodiment) in the circumferential direction of the high-speed shaft 12.

In the speed increaser 14 of the present embodiment, the first, second and third rollers 30, 31, 32 are formed substantially identical in shape to each other. In other words, the first, second and third rollers 30, 31, 32 have substantially the same diameter, which is the dimension in the direction extending perpendicularly to the rotation axis, and the width, which is the dimension in the direction extending along the rotation axis. As shown in FIG. 2, the diameters of the first, second and third rollers 30, 31, 32 are greater than that of the high-speed shaft 12. The diameters of the respective rollers 30, 31, 32 are smaller than the inner radius of the peripheral wall 29 so that the rollers 30, 31, 32 are disposed within the peripheral wall 29. The first, second and third rollers 30, 31, 32 are made of the same material as the high-speed shaft 12.

As shown in FIGS. 1 and 2, the speed increaser 14 further includes a support member 35 that supports the rollers 30, 31, 32 rotatably in cooperation with the plate 24. The support member 35 has a diameter smaller than that of the peripheral wall 29 and is disposed within the peripheral wall 29. As shown in FIG. 2, the support member 35 includes first, second and third support portions 35a, 35b, 35c that are disposed in the spaces each defined by the inner peripheral surface 29a of the peripheral wall 29 and the outer peripheral surfaces of any two adjacent rollers 30, 31, 32.

Each of the first, second and third support portions 35a, 35b, 35c is disposed in the space with a constant clearances formed between the inner peripheral surface 29a of the peripheral wall 29 and the outer peripheral surfaces 30a, 31a, 32a of the respective rollers 30, 31, 32. For example, the first support portion 35a is disposed in the space formed by the inner peripheral surface 29a of the peripheral wall 29, the outer peripheral surface 30a of the first roller 30 and the outer peripheral surface 31a of the second roller 31 with constant clearances formed therebetween. A threaded hole 37 is formed in each of the first, second and third support portions 35a, 35b, 35c for engagement with a bolt 36. The support member 35 is fixed to the plate 24 with the bolts 36 inserted through the first, second and third support portions 35a, 35b, 35c and screwed into the plate 24, respectively.

As shown in FIG. 1, the first roller 30 has projections 40, 41 having a cylindrical shape and extending axially from the center of the opposite end surfaces of the first roller 30. Roller bearings 42, 43 are mounted on the projections 40, 41 through which the first roller 30 is rotatably supported by the plate 24 and the support member 35. The second and third rollers 31, 32 are rotatably supported by the plate 24 and the support member 35 in the same manner as the first roller 30.

The first, second and third rollers 30, 31, 32, the ring member 27 and the high-speed shaft 12 are assembled into a unit while being pressed against each other. The high-speed shaft 12 is rotatably supported by the first, second and third rollers 30, 31, 32. The inner peripheral surface 29a of the peripheral wall 29 is set in contact with the outer peripheral surfaces 30a, 31a, 32a of the rollers 30, 31, 32 at ring contact areas Pa1, Pa 2, Pa3, respectively. The outer peripheral surfaces 30a, 31a, 32a of the rollers 30, 31, 32 are set in contact with the outer peripheral surface 12a of the high-speed shaft 12 at shaft contact areas Pb1, Pb2, Pb3. Pressure is applied to the ring contact areas Pa1, Pa 2, Pa3 and the shaft contact areas Pb1, Pb2, Pb3. The ring contact areas Pa1, Pa 2, Pa3 and the shaft contact areas Pb1, Pb2, Pb3 extend in the axial direction of high-speed shaft 12.

FIG. 3 is a side view of the speed increaser 14 in which some of the parts such as the support member 35 are not shown in the illustration. As shown in FIG. 3, the first, second and third rollers 30, 31, 32 are disposed at their respective axial positions without overlapping each other along the rotation axis 12L of the high-speed shaft 12. In the present embodiment, the first, second and third rollers 30, 31, 32 are disposed with a clearance formed between any two axially adjacent rollers corresponding to the dimension of a flange 45 as measured in the axial direction thereof formed in the high-speed shaft 12. The flanges 45 are spaced away from each other by the dimension of the rollers 30, 31, 32 in the axial direction thereof excluding the projections 40, 41. According to the speed increaser 14 of the present embodiment, the first, second and third rollers 30, 31, 32 are in contact with the high-speed shaft 12 at the shaft contact area Pb1, Pb2, Pb3 which extends along the entire axial dimension of the rollers 30, 31, 32. Because the first, second and third rollers 30, 31, 32 are positioned at axially different positions along the rotation axis 12L of the high-speed shaft 12, the shaft contact areas Pb1, Pb2, Pb3 are free from overlapping with each other along the rotation axis 12L of the high-speed shaft 12. The shaft contact areas Pb1, Pb2, Pb3 are determined by the shapes of the outer peripheral surfaces 30a, 31a, 32a of the respective first, second and third rollers 30, 31, 32.

In the above-described configuration of the speed increaser 14 in which the first, second and third rollers 30, 31, 32 are disposed at the axially different positions and the inner diameter of the peripheral wall 29 is constant along the rotation axis of the high-speed shaft 12, the first, second and third rollers 30, 31, 32 do not interfered with each other even if the diameters of the respective first, second and third rollers 30, 31, 32 are increased with the diameter of the high-speed shaft 12 reduced. In a front view of the speed increaser 14 as in FIG. 2, any two adjacent rollers of the first, second and third rollers 30, 31, 32 may be seen overlapping each other. In a side view of the speed increaser 14 in FIG. 3, however, the first, second and third rollers 30, 31, 32 are arranged without overlapping in the axial direction of the high-speed shaft 12.

As shown in FIGS. 1 and 3, a plurality of the flanges 45 are formed, extending radially outwardly from the outer peripheral surface 12a of the high-speed shaft 12. The flanges 45 are spaced apart one another so that each of the first, second and third rollers 30, 31, 32 is interposed between two adjacent flanges 45, which prevents axial dislocation of the first, second and third rollers 30, 31, 32 relative to the high-speed shaft 12.

According to the speed increaser 14 having the above-described configuration, when the ring member 27 is rotated with the rotation of the low-speed shaft 11 with the oil O sufficiently supplied to the ring contact areas Pa1, Pa 2, Pa3, a solidified oil film (elastohydrodynamic lubrication film) is formed at positions corresponding to the ring contact areas Pa1, Pa 2, Pa3. Specifically, the solidified oil film is formed between the inner peripheral surface 29a of the peripheral wall 29 and the outer peripheral surfaces 30a, 31a, 32a of the respective rollers 30, 31, 32. In other words, the inner peripheral surface 29a of the peripheral wall 29 and the outer peripheral surfaces 30a, 31a, 32a of the respective rollers 30, 31, 32 are in contact with each other through the oil film. The rotation of the ring member 27 is transmitted to the rollers 30, 31, 32 through the oil film formed between the inner peripheral surface 29a of the peripheral wall 29 and the outer peripheral surfaces 30a, 31a, 32a of the respective rollers 30, 31, 32 thereby to rotate the rollers 30, 31, 32 in the same rotational direction.

Similarly, a solidified oil film is formed at positions corresponding to the shaft contact areas Pb1, Pb2, Pb3 with the rotation of the first, second and third rollers 30, 31, 32. Specifically, a solidified oil film is formed between the outer peripheral surface 12a of the high-speed shaft 12 and the outer peripheral surfaces 30a, 31a, 32a of the respective first, second and third rollers 30, 31, 32. In other words, the outer peripheral surface 12a of the high-speed shaft 12 and the outer peripheral surfaces 30a, 31a, 32a of the respective first, second third rollers 30, 31, 32 are in contact with each other through the oil film. The rotation of the first, second and third rollers 30, 31, 32 is transmitted to rotate the high-speed shaft 12 through the oil film formed between the outer peripheral surface 12a of the high-speed shaft 12 and the outer peripheral surfaces 30a, 31a, 32a of the respective first, second and third rollers 30, 31, 32, thereby rotating the high-speed shaft 12. The peripheral wall 29 of the ring member 27 is rotated at the same speed as the low-speed shaft 11, meanwhile the first, second and third roller 30, 31, 32 rotate at a speed greater than the low-speed shaft 11. The high-speed shaft 12 having a diameter smaller than the first, second and third rollers 30, 31, 32 is rotated at a speed greater than that of the first, second and third rollers 30, 31, 32. In the speed increaser 14 of the present embodiment, the high-speed shaft 12 thus rotates at a speed that is greater than that of the low-speed shaft 11 according to the speed increaser 14.

The speed increaser 14 of the first embodiment offers the following effects.

(1) In the speed increaser 14 in which the first, second and third rollers 30, 31, 32 are disposed at their respective axial positions along the rotation axis 12L of the high-speed shaft 12, no interference occurs between the first, second and third rollers 30, 31, 32. Thus, the diameters of the first, second and third rollers 30, 31, 32 may be increased while reducing the diameter of the high-speed shaft 12 in order to achieve a greater speed ratio without causing interference between the rollers. Because interference between the rollers need not be considered, a desirable speed ratio may be set using three rollers in the speed increaser 14.

(2) According to the speed increaser 14 of the present embodiment, any desirable speed ratio may be set if structural factors such as the size of the speed increaser 14 and the strength of the high-speed shaft 12 need not be considered.

Figure 4:
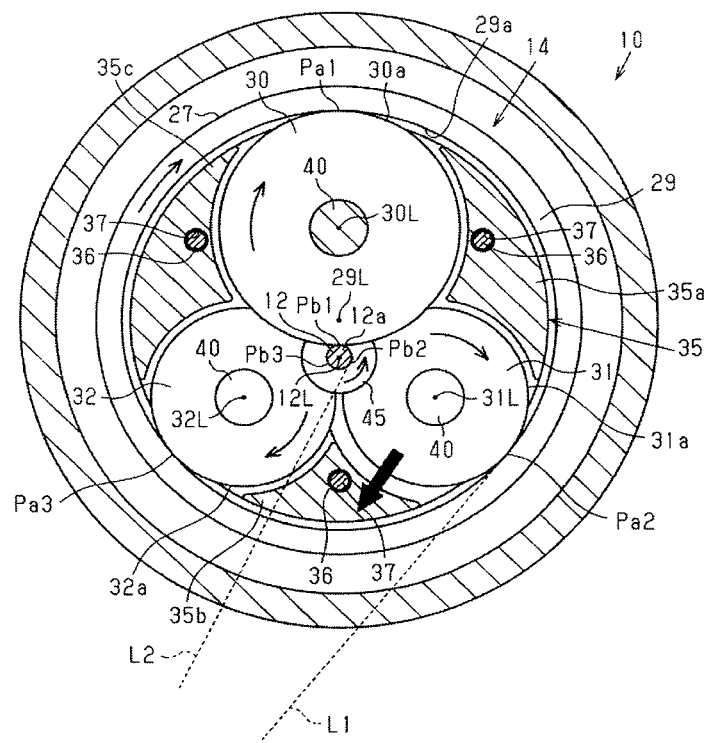
FIG. 4 is a cross-sectional view of a speed increaser according to a second embodiment of the present invention.

The following will describe a speed increaser 14 according to a second embodiment of the present invention with reference to FIG. 4. Like parts or elements are designated by like reference numerals and the description thereof will not be reiterated.

The speed increaser 14 of the second embodiment is configured to transmit torque from the input shaft (low-speed shaft 11) to output shaft (high-speed shaft 12) by generating a pressing load with the wedge effect of the oil film at contact areas between the peripheral wall 29 and the rollers 30, 31, 32 and between the rollers 30, 31, 32 and the high-speed shaft 12.

As with the first embodiment, the rotation axis 11L of the low-speed shaft 11 and the rotation axis 29L of the peripheral wall 29 extend in alignment with each other in the speed increaser 14 of the second embodiment. Meanwhile, the rotation axis 12L of the high-speed shaft 12 is disposed eccentric to the rotation axis 11L of the low-speed shaft 11 and the rotation axis 29L of the peripheral wall 29. The rotation axis 12L of the high-speed shaft 12 is offset at a predetermined distance from the rotation axis 11L of the low-speed shaft 11 and the rotation axis 29L of the peripheral wall 29, though the rotation axis 12L of the high-speed shaft 12 extends in the same direction as the rotation axis 11L of the low-speed shaft 11.

As shown in FIG. 4, the speed increaser 14 includes the first, second and third rollers 30, 31, 32 that are disposed within the peripheral wall 29 and in contact with both the peripheral wall 29 and the high-speed shaft 12, respectively. Of the first, second and third rollers 30, 31, 32, the first and third rollers 30, 32 are fixed rollers that are rotatable about their respective rotation axes at fixed positions, while the second roller 31 is a movable roller that is movable relative to the high-speed shaft 12 and the peripheral wall 29.

The diameters of the respective first, second and third rollers 30, 31, 32 are greater than that of the high-speed shaft 12 and set so as to be disposed within the peripheral wall 29. Because the high-speed shaft 12 and the peripheral wall 29 of the speed increaser 14 of the second embodiment are disposed with their rotation axes 12L and 29L offset from each other, the diameters of the respective first, second and third rollers 30, 31, 32 are determined according the distances between the inner peripheral surface 29a of the peripheral wall 29 and the outer peripheral surface 12a of the high-speed shaft 12 at positions of the first, second and third rollers 30, 31, 32 where the ring contact areas Pa1, Pa2, Pa3 and the shaft contact area Pb1, Pb2, Pb3 are secured. In the second embodiment, the diameter of the first roller 30 is greater than those of the second and the third rollers 31, 32 which have substantially the same diameter.

The first and third rollers 30, 32 are supported on the projections 40, 41 via the roller bearings 42, 43 rotatably relatively to the plate 24 and the support member 35 and immovably relative to the high-speed shaft 12 and the peripheral wall 29. The second roller 31 is also supported on the projections 40, 41 via the roller bearings 42, 43 rotatably relatively to the plate 24 and the support member 35 and movably in the circumferential direction of the peripheral wall 29 relative to the high-speed shaft 12 and the peripheral wall 29. The support member 35 supports the second roller 31 so that the second roller 31 is not moved beyond its movable range.

As with the first embodiment, the first, second and third rollers 30, 31, 32 are positioned at axially different positions along the rotation axis 12L of the high-speed shaft 12, so that the shaft contact areas Pb1, Pb2, Pb3 between the high-speed shaft 12 and the respective first, second and third rollers 30, 31, 32 do not overlap with each other along the high-speed shaft 12.

In FIG. 4, symbol L1 designates a line that is tangential to the second roller 31 at the point corresponding to the ring contact area Pa2 and L2 designates a line that is tangential to the second roller 31 at the point corresponding to the shaft contact area Pb2. Because the axis of the high-speed shaft 12 and the axis of the peripheral wall 29 are offset from each other, the lines L1, L2 intersect each other thereby to form an acute angle, or a wedge shape.

As indicated by thick arrow, the second roller 31 is movable toward and away from the intersection between the lines L1, L2. When the peripheral wall 29 of the ring member 27 is rotated by normal rotation of the electric motor 13, a force is generated that causes the second roller 31 to move toward the intersection between the lines L1, L2. With such movement of the second roller 31, the second roller 31 receives an increasing force from the peripheral wall 29 and the high-speed shaft 12 due to the wedge effect. In other words, the second roller 31 is arranged so as to move in the direction in which a force applied from the peripheral wall 29 and the high-speed shaft 12 to the second roller 31 increases with the rotation of the peripheral wall 29 rotated by the rotation of the low-speed shaft 11. Accordingly, the speed increaser 14 of the second embodiment increases the power transmitted from the low-speed shaft 11 to the high-speed shaft 12.

The speed increaser 14 of the second embodiment offers the following effects.

(3) Because the first, second and third rollers 30, 31, 32 are disposed at different positions along the rotation axis 12L of the high-speed shaft 12, no interference occurs between any two of the first, second and third rollers 30, 31, 32, so that no roller can enter the moving range of the second roller 31 serving as movable roller. Accordingly, movable area for the second roller 31 may be set without any restriction, so that the wedge effect may be increased as desired. In addition, because the high-speed shaft 12 is supported by the first, second third rollers 30, 31, 32, the wedge effect may be increased with the high-speed shaft 12 being supported stably.

(4) In the speed increaser 14 using the wedge effect, the first, second and third rollers 30, 31, 32 need be disposed so that no interference occurs between the movable second roller 31 and the other first and third rollers 30, 32. Specifically, clearances need to be secured between the movable second roller 31 and the other first and third rollers 30, 32 disposed adjacently to the movable roller with the movable range taken into consideration to prevent the rollers from interfering with each other. The clearances thus formed in the speed increaser having a movable roller are greater, as compared with the case in which all the rollers are rotatable about their respective fixed axes. In such case, the diameter of the movable roller need to be reduced, and the diameter of the output shaft (high-speed shaft 12) need to be increased for the movable roller to set in contact with the output shaft. With the increased diameter of the output shaft, the speed ratio is reduced. In the speed increaser 14 of the present embodiment, because there is no need to consider interference of the movable second roller 31 with the other first and third rollers 30, 32, the diameter of the movable second roller 31 need not be reduced in order to prevent interference with other rollers. The speed increaser 14 of the second embodiment offers the above-described effect (1) and (2), as with the speed increaser 14 of the first embodiment.

The speed increaser 14 of the present invention may be modified in various manners, as exemplified below.

In the first embodiment, the first, second and third rollers 30, 31, 32 need not be spaced at a regular interval in the circumferential direction of the high-speed shaft 12 as long as the high-speed shaft 12 is stably held by the rollers 30, 31, 32. In other words, the first, second and third rollers 30, 31, 32 may be disposed at any desirable positions in the circumferential direction of the high-speed shaft 12 in accordance with the sizes and the positions of the contact areas so as to stably support the high-speed shaft 12.

In the first embodiment, the diameters of the first, second and third rollers 30, 31, 32 may be different from one another. All three of the first, second and third rollers 30, 31, 32 or only one of them, may be formed with a diameter that is different from the others. In this case the rotation axis 12L of the high-speed shaft 12 is not disposed coaxially with the rotation axis 29L of the peripheral wall 29, or with the rotation axis 11L of the low-speed shaft 11. It is to be noted that the first, second and third rollers 30, 31, 32 are fixed roller in this modification that are rotatable at their fixed positions.

The speed increaser 14 of the second embodiment may be modified in such a way two of the rollers are movable in the circumferential direction of the high-speed shaft 12.

Although the first, second and third rollers 30, 31, 32 are disposed so that the entire shaft contact Pb1, Pb2, Pb3 areas between the high-speed shaft 12 and the outer peripheral surfaces 30a, 31a, 32a of the respective first, second and third rollers 30, 31, 32 are free from overlapping with each other along the high-speed shaft 12, the first, second and third rollers 30, 31, 32 may be so arranged that the shaft contact areas Pb1, Pb2, Pb3 partially overlap as long as no interference occurs between any two rollers. In this case, the dimension of the speed increaser 14 may be reduced.

The first, second and third rollers 30, 31, 32 may be formed with different axial dimensions.

The compression part 15 need not necessarily be of impeller type. For example, the vane type, or scroll type compression part may be used for the centrifugal compressor 10.

The use of the speed increaser 14 is not limited to the centrifugal compressor 10. The speed increaser 14 may be mounted to any equipment other than a vehicle.

The centrifugal compressor 10 may be used for compression of any fluid. For example, the centrifugal compressor 10 may be used for an air conditioner for compressing a refrigerant gas.

What is claimed is:

1. A speed increaser comprising:
    an annular peripheral wall disposed coaxially with a low-speed shaft and rotatable with a rotation of the low-speed shaft;
    a high-speed shaft disposed within the peripheral wall and having a rotation axis extending in the same direction as a rotation axis of the peripheral wall; and
    three rollers disposed within the peripheral wall and in contact with both the peripheral wall and the high-speed shaft,
    wherein the three rollers are disposed at different positions along the rotation axis of the high-speed shaft with rotation axes of the three rollers extending in the same direction as the rotation axis of the high-speed shaft, and the rotation axes of the three rollers are spaced in a circumferential direction of the high-speed shaft, and
    wherein the three rollers are disposed so that at least part of contact areas between the high-speed shaft and the rollers is free from overlapping with each other along the rotation axis of the high-speed shaft.

2. The speed increaser according to claim 1, wherein the rotation axis of the high-speed shaft is offset from a rotation axis of the low-speed shaft and the rotation axis of the peripheral wall, wherein the three rollers include at least one fixed roller and at least one movable roller that is movable with the rotation of the peripheral wall, and wherein the movable roller is arranged to move in a direction in which a force applied from the peripheral wall and the high-speed shaft to the movable roller increases with the rotation of the peripheral wall rotated by the rotation of the low-speed shaft.

3. An electric compressor comprising:
    an electric motor driving to rotate a low-speed shaft;
    a speed increaser including a high-speed shaft and transmitting a rotation of the low-speed shaft to the high-speed shaft, and
    a compression part connected to the high-speed shaft and compressing a fluid with a rotation of the high-speed shaft,
    wherein the speed increaser includes an annular peripheral wall disposed coaxially with the low-speed shaft and rotatable with a rotation of the low-speed shaft, the high-speed shaft disposed within the peripheral wall and having a rotation axis extending in the same direction as a rotation axis of the peripheral wall, and three rollers disposed within the peripheral wall and in contact with both the peripheral wall and the high-speed shaft,
    wherein the three rollers are disposed at different positions along the rotation axis of the high-speed shaft with rotation axes of the three rollers extending in the same direction as the rotation axis of the high-speed shaft, and the rotation axes of the three rollers are spaced in a circumferential direction of the high-speed shaft, and
    wherein the three rollers are disposed so that at least part of contact areas between the high-speed shaft and the rollers is free from overlapping with each other along the rotation axis of the high-speed shaft.

* * * * *